US010638530B2

(12) United States Patent
Xu et al.

(10) Patent No.: US 10,638,530 B2
(45) Date of Patent: Apr. 28, 2020

(54) ELECTRONIC DEVICE FOR WIRELESS COMMUNICATIONS AND WIRELESS COMMUNICATIONS METHOD

(71) Applicant: SONY CORPORATION, Tokyo (JP)

(72) Inventors: Jin Xu, Beijing (CN); Xiaodong Xu, Beijing (CN); Ce Wang, Beijing (CN); Yunqiu Xiao, Beijing (CN)

(73) Assignee: SONY CORPORATION, Tokyo (JP)

( * ) Notice: Subject to any disclaimer, the term of this patent is extended or adjusted under 35 U.S.C. 154(b) by 69 days.

(21) Appl. No.: 15/739,817

(22) PCT Filed: Jul. 19, 2016

(86) PCT No.: PCT/CN2016/090508
§ 371 (c)(1),
(2) Date: Dec. 26, 2017

(87) PCT Pub. No.: WO2017/012534
PCT Pub. Date: Jan. 26, 2017

(65) Prior Publication Data
US 2018/0192459 A1    Jul. 5, 2018

(30) Foreign Application Priority Data
Jul. 20, 2015 (CN) .......................... 2015 1 0427403

(51) Int. Cl.
*H04W 76/14* (2018.01)
*H04W 76/23* (2018.01)
(Continued)

(52) U.S. Cl.
CPC ........... *H04W 76/14* (2018.02); *H04W 28/18* (2013.01); *H04W 76/23* (2018.02); *H04L 5/001* (2013.01); *H04W 72/04* (2013.01); *H04W 72/048* (2013.01)

(58) Field of Classification Search
None
See application file for complete search history.

(56) References Cited

U.S. PATENT DOCUMENTS

| 9,408,212 B2 | 8/2016 | Wijting et al. | |
| 2013/0188510 A1* | 7/2013 | Siomina | H04W 24/10 370/252 |

(Continued)

FOREIGN PATENT DOCUMENTS

| CN | 103298141 A | 9/2013 |
| CN | 104144519 A | 11/2014 |

(Continued)

OTHER PUBLICATIONS

International Search Report dated Sep. 23, 2016 in PCT/CN2016/090508 filed Jul. 19, 2016.

*Primary Examiner* — Shripal K Khajuria
(74) *Attorney, Agent, or Firm* — Xsensus LLP

(57) ABSTRACT

An electronic device for wireless communications and a wireless communications method. The electronic device includes one or more processors. The processor is configured to determine the current carrier aggression status of first user equipment in response to a proximity-based service direct communication requirement of the first user equipment. The processor is further configured to determine a radio resource configuration of the first user equipment based on the carrier aggression status of the first user equipment, the radio resource configuration being used for proximity-based service direct communication of the first user equipment.

18 Claims, 13 Drawing Sheets

(51) Int. Cl.
    *H04W 28/18*     (2009.01)
    *H04W 72/04*     (2009.01)
    *H04L 5/00*     (2006.01)

(56) References Cited

U.S. PATENT DOCUMENTS

| | | | |
|---|---|---|---|
| 2013/0215736 A1* | 8/2013 | Han | H04L 5/001 370/216 |
| 2014/0192716 A1* | 7/2014 | Pantelidou | H04W 28/02 370/328 |
| 2015/0341148 A1* | 11/2015 | Kazmi | H04L 5/0098 370/252 |

FOREIGN PATENT DOCUMENTS

| | | | | |
|---|---|---|---|---|
| CN | 104349355 A | 2/2015 | | |
| WO | WO-2013181785 A1 * | 12/2013 | | H04L 5/001 |
| WO | WO-2014175149 A1 * | 10/2014 | | H04W 76/14 |

\* cited by examiner

ELECTRONIC DEVICE FOR WIRELESS COMMUNICATIONS AND WIRELESS COMMUNICATIONS METHOD

FIELD

The present disclosure relates to the field of wireless communication, and in particular to an electronic device for wireless communication and a wireless communication method.

BACKGROUND

Proximity-based service (ProSe) direct communication in the third generation partnership project (3GPP) standards refers to a mode in which user equipments (UE) can directly communicate with each other. ProSe direct communication may include, for example, device-to-device (D2D) communication and vehicle-to-related entity communication (V2X communication, which may include, for example vehicle-to-vehicle (V2V) communication, vehicle-to-infrastructure (V2I) communication and vehicle-to-pedestrian (V2P) communication). As shown in a schematic diagram in FIG. 14, a link between UE1 and UE2 between which a proximity-based service direct communication is performed is referred to as a sidelink. UE1 and UE2 are connected together via a PC5 interface, and UE1 and UE2 are connected to a base station via a Uu interface.

In addition, according to existing standards, in a case of a radio resource control (RRC) connection, an evolved base station (eNB) schedules a UE to perform a ProSe direct communication on the same resource as a major frequency of cellular communication between the UE and the eNB. Further, a UE that is RRC connected to other cell can also perform a ProSe direct communication based on a radio communication resource, such as a resource pool broadcasted on a public safety ProSe carrier, detected by the UE.

SUMMARY

An overview of the embodiments of the present disclosure is given hereinafter, to provide a basic understanding for some aspects of the present disclosure. It should be understood that, the overview is not exhaustive overview of the present disclosure. The overview is not intended to determine key parts or important parts of the present disclosure, and nor intended to limit the scope of the present disclosure. The object of the overview is only to give some concepts of the present disclosure in a simplified form, as a preface of the detailed description later.

An electronic device for wireless communication is provided according to an embodiment, which includes at least one processor. The processor is configured to determine a current carrier aggregation state of a first user equipment in response to a request for a proximity-based service direct communication of the first user equipment. The processor is further configured to determine a radio resource configuration of the first user equipment based on the carrier aggregation state of the first user equipment, wherein the radio resource configuration is used for the proximity-based service direct communication of the first user equipment.

A wireless communication method is provided according to another embodiment. The method includes a step of determining a current carrier aggregation state of a first user equipment in response to a request for a proximity-based service direct communication of the first user equipment. The method further includes a step of determining a radio resource configuration of the first user equipment based on the carrier aggregation state of the first user equipment, wherein the radio resource configuration is used for the proximity-based service direct communication of the first user equipment A solution in which the radio resource configuration for a ProSe direct communication is scheduled based on the carrier aggregation state of the UE is provided according to the embodiments of the present disclosure. As compared with the conventional manner, the solution of the present disclosure facilitates shortening a measurement time of the UE for the radio resource configuration and reducing communication overhead.

BRIEF DESCRIPTION OF THE DRAWINGS

The present disclosure may be better understood with reference to the following description given in conjunction with the drawings, in which, same or like reference numerals are used to denote the same or like components throughout the drawings. The drawings along with the following detailed description are contained in the specification and form a part of the specification, and are used to further exemplify preferred embodiments of the present disclosure and explain principles and advantages of the present disclosure. In the drawings.

DETAILED DESCRIPTION OF EMBODIMENTS

Figure 1:
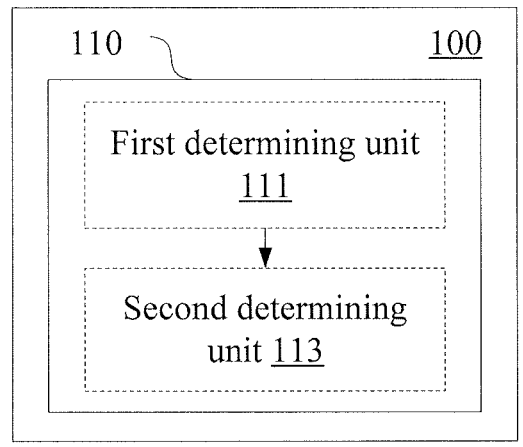
FIG. 1 is a block diagram showing a configuration example of an electronic device for wireless communication according to an embodiment of the present disclosure.

The embodiments of the present disclosure will be described below with reference to the drawings. Elements and features described in one of the drawings or one embodiment of the present disclosure may be combined with elements and features described in one or more other drawings or embodiments. It should be noted that, for clarity, representation and description of components and processing which are irrelevant to the present disclosure and known by those skilled in the art are omitted in the drawings and the specification.

As shown in FIG. 1, an electronic device 100 for wireless communication according to an embodiment includes a processor 110. As illustrated below in conjunction with specific embodiments, the electronic device 100 may operate as a base station or a user equipment.

In addition, it should be noted that, although a first determining unit 111 and a second unit 113 in the processor 110 are shown with separated dash boxes in FIG. 1, it should be understood that functions of the first determining unit 111 and the second determining unit 113 may also be implemented by the processor 110 as a whole, and are unnecessarily implemented by discrete components in the processor 110. In addition, although the processor 110 is shown with a single block in FIG. 1, the communication device 100 may include multiple processors, and the functions of the first determining unit 111 and the second determining unit 113 may be distributed in the multiple processors, thus the multiple processors operatively cooperate with each other to execute the functions.

The first determining unit 111 is configured to determine a current state of carrier aggregation of a first user equipment in response to a request for a proximity-based service direct communication of the first user equipment.

In a case that a user equipment communicates with a base station in a manner of carrier aggregation, for example, in a downlink carrier aggregation, the base station may transmit primary control signaling to the user equipment on a primary component carrier (PCC) corresponding to a primary cell (Pcell), the primary control signaling includes a resource scheduling instruction for a secondary component carrier (SCC) corresponding to a secondary cell (Scell). Thereby, a cross-carrier scheduling can be realized. In another aspect, in an uplink carrier aggregation, the user equipment generally transmits uplink control information to the base station through the primary cell. An operation manner in which the carrier aggregation and the proximity-based service direct communication are combined together is not involved in the current standardization discussion. The user equipment generally communicates with the base station and another user equipment on a same carrier in a time-division manner. However, such operation manner is inefficient, and the present disclosure aims to provide some solutions.

As described above, the electronic device 100 may operate as a base station or a user equipment. For example, in a case that the electronic device 100 operates as a base station, a first user equipment in a RRC connection with the base station may transmit indication information to the base station when the first user equipment is to perform a proximity-based service direct communication, and the base station determines a current carrier aggregation state of the first user equipment in response to the indication information for example based on information stored in the base station. In addition, in a case that the electronic device 100 is the first user equipment, the electronic device 100 may directly obtain a request for proximity-based service direct communication and a current carrier aggregation state.

The second determining unit 113 is configured to determine a radio resource configuration of the first user equipment based on the carrier aggregation state of the first user equipment. The radio resource configuration is used for the proximity-based service direct communication of the first user equipment.

According to an embodiment, the second determining unit 113 may be configured to determine whether to reconfigure a current carrier aggregation to enable the proximity-based service direct communication based on the determined carrier aggregation state and equipment capability of the first user equipment. The carrier aggregation state may include the number of aggregated component carriers (CC). For example, the equipment capability of the first user equipment may include support capability for an uplink multi-carrier, for example, uplink aggregation capability (for example, whether uplink carrier aggregation is supported, an upper limit of the number of carriers supported by the uplink carrier aggregation). Correspondingly, the carrier aggregation state may include the number of the current uplink component carriers.

In addition, the reconfiguration of the current carrier aggregation may include releasing at least one of the aggregated component carrier. The reconfiguration may also include configuring one of the aggregated component carriers to be used for the proximity-based service direct communication.

More specifically, the second determining unit 113 may for example be configured to, in a case that the number of the aggregated component carriers reaches a predetermined threshold, release at least one of the aggregated component carriers and configure one of the component carriers to be used for the proximity-based service direct communication. The predetermined threshold is determined based on for example the equipment capability of the user equipment, for example, the upper limit of the number of carriers that can be supported.

According to the embodiment, in a case of carrier aggregation, the UE may be scheduled directly to perform ProSe communication on a used secondary component carrier (SCC), thereby facilitating shortening a measurement time and reducing communication overhead for the radio resource configuration, for example.

Next, an example manner of notifying the UE of reconfiguration for the carrier aggregation is described by taking a case that the electronic device 100 operates as the base station as an example. For example, the base station may notify the UE of reconfiguration for the current carrier aggregation in the form of a bitmap in a medium access control (MAC) signaling. Alternatively, the base station may also notify the UE of the reconfiguration with different information elements (IE) in the same RRC signaling (for example, RRCConnectionReconfiguration), for example, information (sCellToReleasList) on a secondary carrier to be released and configuration information (sl-CommConfig) on a sidelink for ProSe. In the two IEs, a frequency of the carrier to be released is the same as a frequency of a carrier for the proximity-based service direct communication.

For example, in order to have a same structure as payload of an existing MAC control element (CE), the component carrier may be represented with data bits of 8 bits shown in Table 1.

TABLE 1

| C7 | C6 | C5 | C4 | C3 | C2 | C1 | 1 |
|----|----|----|----|----|----|----|---|

For example, the bitmap of 8 bits may represent whether eight cells serve as component carriers for ProSe, and only a part of bits may be used as needed. In the embodiment, the last bit is set to be 1 to identify that the signaling is ProSe indication signaling.

For the first seven bits, 0 represents that a corresponding serving cell does not carry the ProSe direct communication, and 1 represents that a corresponding serving cell is to carry the ProSe direct communication.

For example, ProSe direct communication is to be established on the primary component carrier PCC in a case of C7=1, and ProSe direct communication is to be established on the secondary component carrier SCC1 in a case of C6=1. In some exemplary embodiment, at most one bit in the first seven bits may be set to be 1, and the other bits are set to be 0.

In addition, a part or all of the eight bits may be encoded. For example, the encoding of eight bits can represent the condition of at least 256 cells, and a part of the bits can be used as needs. For example, three bits "001" may be used to represent PCC of the UE, and "010" may be used to represent SCC1 of the UE and the like, as shown in Table 2.

TABLE 2

| Indicator | 0/1 | 0/1 | 0/1 | NULL | NULL | NULL | NULL |
|-----------|-----|-----|-----|------|------|------|------|

In addition, according to an embodiment, the second determining unit 113 may be configured to preferentially select a component carrier of the aggregated component carriers which has a low channel quality or is not activated, to be released or to be used as a carrier for proximity-based service direct communication.

In the embodiment, the current carrier aggregation is reconfigured to enable the proximity-based service direct communication while reducing an effect on original communication performed with the carrier aggregation.

According to another embodiment, the second determining unit 113 may be configured to, in a case that a carrier currently used by a second user equipment which is to perform proximity-based service direct communication with the first user equipment is the same as one of the aggregated component carriers used by the first user equipment, select that same carrier as a carrier for the proximity-based service direct communication between the second user equipment and the first user equipment.

In the embodiment, since each of two user equipments, between which the proximity-based service direct communication is performed, performs the proximity-based service direct communication with the component carrier currently used, the measurement time and the communication overhead for the radio resource configuration can be further reduced.

Next, an example of configuring one of the aggregated component carriers to be used for the proximity-based service direct communication is described by taking a case that the electronic device 100 operates as a base station as an example. Some aspects of the above embodiments are involved in the example, however, it should be noted that the present disclosure is not limited to specific details in the example.

In a case that a component carrier needs to be selected from the existing component carriers to be used for the proximity-based service direct communication, for example, the base station compares channel quality of the component carriers based on a sounding reference signal (SRS) reported by the user, and select a component carrier having low channel quality to be used for the proximity-based service direct communication. Particularly, in a case that a same component carrier is used by two UEs between which the proximity-based service direct communication is to be performed, the component carrier may be used for carrying the proximity-based service direct communication without necessarily considering the channel quality, thereby realizing configuration for the two UEs with low overhead. After selecting the component carrier for carrying the proximity-based service direct communication from the existing component carriers of the UE, the base station may transmit indication signaling regarding the component carrier to the user equipment, the signaling is used to notify the user equipments of the component carrier for proximity-based service direct communication.

More specifically, assuming UE1 performs cellular communication on component carriers CC1, CC2 and CC3, where CC1 is a PCC, and CC2 and CC3 are SCCs. The base station may compare uplink channel quality of CC2 and CC3, and select a component carrier for example CC3 having low channel quality from CC2 and CC3, and determine CC3 to be used for the proximity-based service direct communication.

For another example, assuming a PCC of UE1 is CC1, SCC1 and SCC2 of UE1 are CC2 and CC3, respectively, and PCC of UE2 is CC1 and UE2 does not have SCC. Since a same carrier CC1 is used by UE1 and UE2, CC1 may be used for the proximity-based service direct communication between UE1 and UE2.

After selecting the carrier, the base station transits indication signaling regarding the component carrier to the user, and the signaling is used to notify the user of on which CC the proximity-based service direct communication is to be established.

Figure 9:
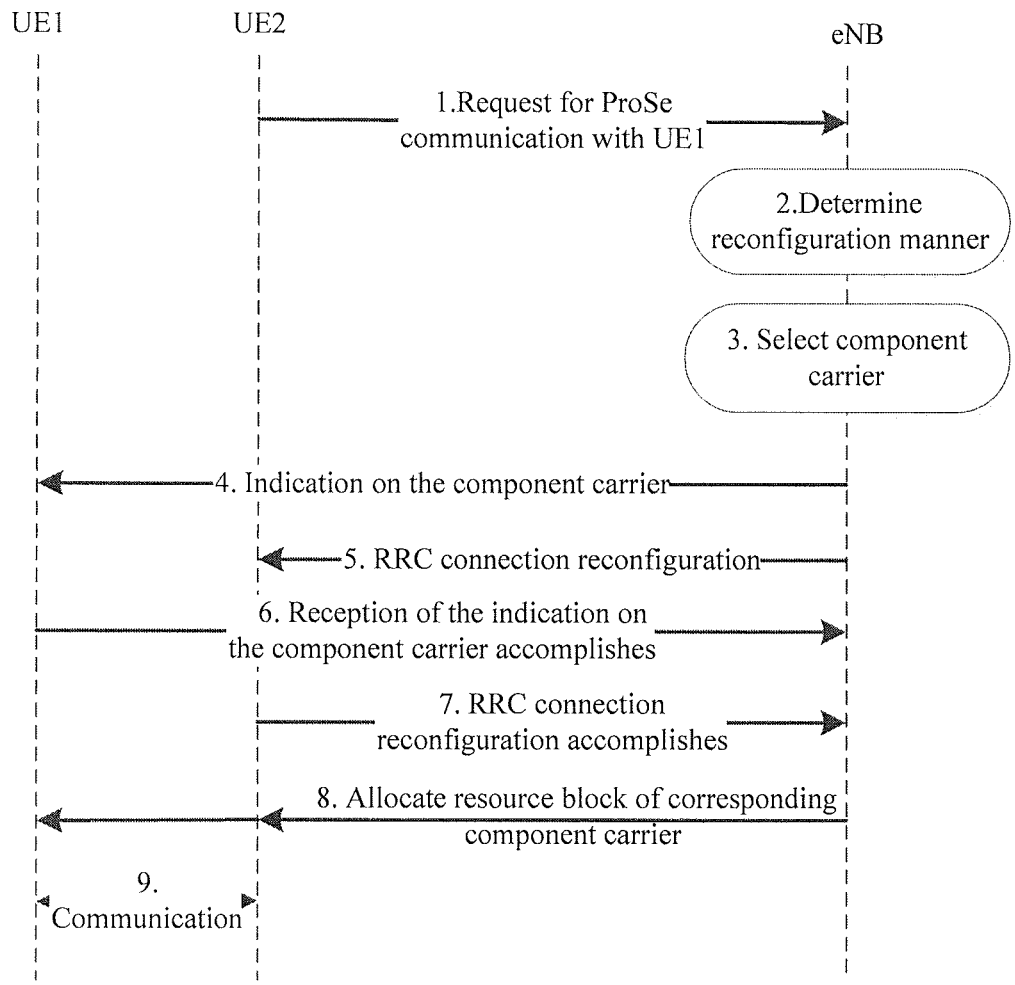
FIG. 9 is a signaling flow chart for explaining a process example of a radio resource configuration according to an embodiment of the present disclosure.

FIG. 9 shows a signaling flow example corresponding to the example.

In step 1, UE2 transmits a request for proximity-based service direct communication with UE1 to a base station, and the request is for example ProSe UE Information indication.

In step 2, the base station determines a reconfiguration manner for carrier aggregation, for example, adding a new component carrier for UE1 or selecting one of existing component carriers of UE1 to be used for the proximity-based service direct communication.

For example, in a case that it is determined that one of the existing component carriers is selected to be used for the proximity-based service direct communication, in step 3, the base station selects one of the component carriers of UE1 to be used for the proximity-based service direct communication.

In step 4, the base statin transmits indication signaling (for example, the component carrier is indicated by a control unit in the MAC layer) for the component carrier to UE1.

In step 5, the base station transmits RRC connection reconfiguration signaling to UE2.

In step 6, UE1 transmits a receiving response to the indication signaling for the component carrier to the base station.

In step 7, UE2 transmits a RRC connection reconfiguration response to the base station.

In step 8, the base station allocates resource blocks in the selected carrier to UE1 and UE2 for example through a physical downlink control channel (PDCCH).

In step 9, UE1 and UE2 perform the proximity-based service direct communication.

It should be noted that, the indication signaling transmitted to UE1 from the base station in the above step 4 is not necessary in some cases. For example, the proximity-based service direct communication may further include a manner of proximity-based service direct discovery, in which other neighboring UE is discovered through a direct radio signal via a PC5 interface. In such discovery examples, UE2 transmits a discovery signal, and UE1 only needs to receive and discover, and does not transmit information to UE2, so configuration for component carrier is not required.

The embodiment in which one of the aggregated component carriers is configured to be used for the proximity-based service direct communication is described above. In addition, according to some embodiments, the second determining unit 113 may also be configured to determine a carrier for the proximity-based service direct communication of the first user equipment from a predetermined set of carriers.

More specifically, the second determining unit 113 may be configured to select a carrier (add a new carrier) for the proximity-based service direct communication from a set of carriers in a case that the number of aggregated component carriers used by the first user equipment does not reach the predetermined number. The set of carriers may include multiple carriers which can be scheduled by a serving base station of the first user equipment and are not used by the first user equipment and the second user equipment which is to perform the proximity-based service direct communication with the first user equipment.

In a case that the electronic device operates as the base station, for example, the carrier for the proximity-based service direct communication may be selected in the following manners.

For component carriers available for the proximity-based service direct communication of each group of user equipments which are to perform the communication, one component carrier is selected randomly to be used for the proximity-based service direct communication.

For component carriers available for the proximity-based service direct communication of each group of user equipments which are to perform the communication, a carrier for the proximity-based service direct communication is selected based on usage of the component carriers. For example, the usage of the component carrier may include the number of user equipments which are performing cellular communication using the component carrier.

For component carriers available for the proximity-based service direct communication of each group of user equipments which are to perform the communication, a component carrier having lower history measured channel quality is selected based on history measured channel quality, for example, RSRP, of selectable component carriers reported by the group of user equipments, to be used for the proximity-based service direct communication.

Next, an example manner of determining a carrier for proximity-based service direct communication from a predetermined set of carriers is described in conjunction with an specific embodiment.

According to an embodiment, the second determining unit 113 is configured to select a carrier to be used for the proximity-based service direct communication also based on usage of carriers in the predetermined set of carriers by a user equipment other than the first user equipment served by a serving base station.

For example, there can be a list of selectable carriers corresponding to each group of user equipments which is to perform proximity-based service direct communication. The list may include all component carriers available for the proximity-based service direct communication of the group of user equipments. The component carriers may include, for example, all component carriers which can be allocated by the base station other than component carriers currently used by the group of user equipments which is to perform the proximity-based service direct communication.

An objective of selecting the component carrier based on usage of the component carriers is to use a component carrier, having an interference as low as possible, for the proximity-based service direct communication.

More specifically, the usage of a carrier may include one or more of the following aspects:

the number of user equipments currently performing cellular communication using a certain carrier, for example, a carrier for which the number is small may be selected preferentially to reduce the interference between proximity-based service direct communication and cellular communication;

the number of user equipments currently performing proximity-based service direct communication using a certain carrier, for example, a carrier for which the number is small may be selected preferentially to reduce the interference between proximity-based service direct communications;

a cover range of a certain carrier, for example, a component carrier with a small cover range (that is, a carrier with a high frequency) may be selected;

a frequent degree of using a certain carrier in a history record, for example, a carrier which is used with a low frequent degree may be selected; and a total time length of using a certain carrier in a history record, for example, a carrier having the smallest using time length may be selected.

By selecting the carrier for proximity-based service direct communication based on the usage, an effect of the proximity-based service direct communication on the cellular communication can be reduced.

Figure 10:
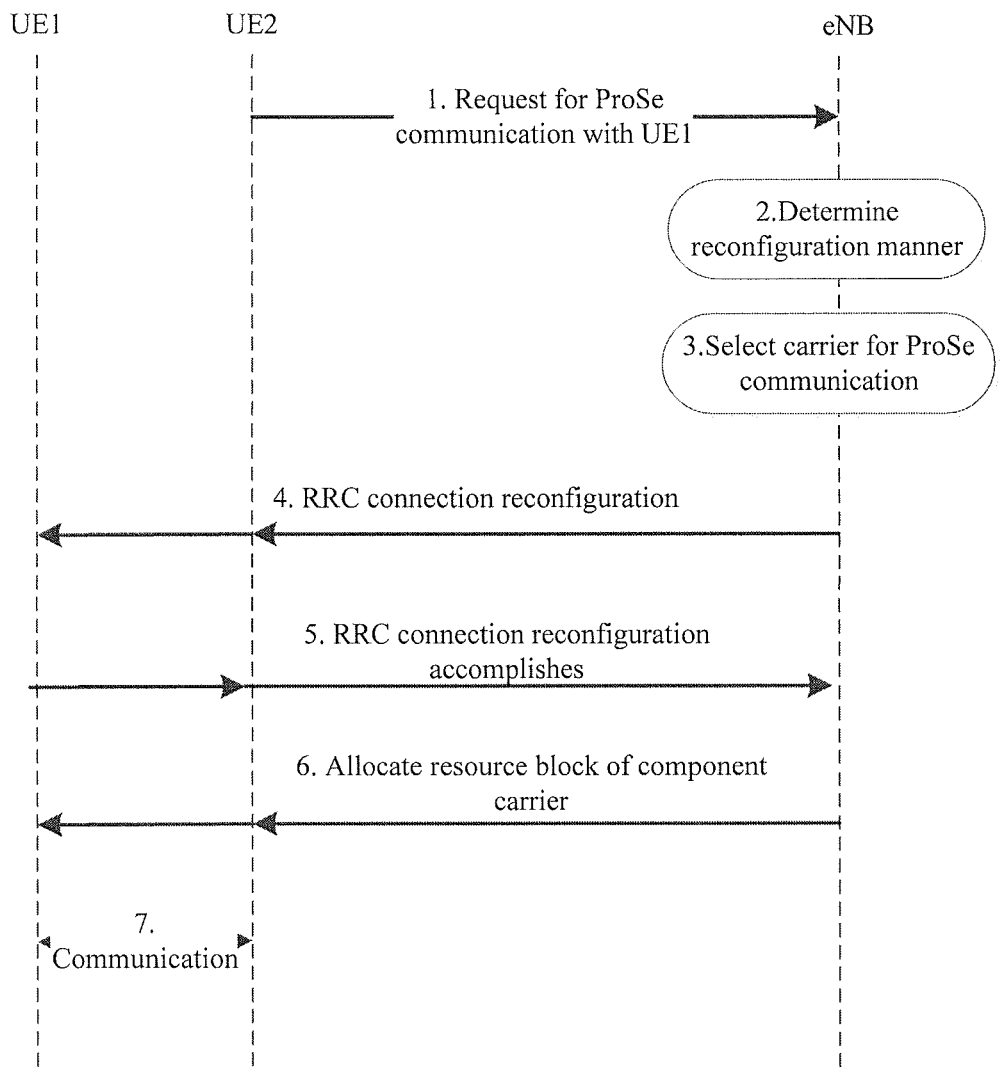
FIG. 10 is a signaling flow chart for explaining a process example of a radio resource configuration according to an embodiment of the present disclosure.

FIG. 10 shows a signaling flow chart of selecting a carrier for proximity-based service direct communication from a predetermined set of carriers by a base station.

In step 1, UE2 requests for proximity-based service direct communication with UE1 to a base station.

In step 2, the base station determines a reconfiguration manner for carrier aggregation, for example, determines to add a new component carrier for UE1.

In step 3, the base station selects a carrier for the proximity-based service direct communication from a predetermined set of carriers.

In step 4, the base statin transmits RRC connection reconfiguration signaling to UE1 and UE2.

In step 5, UE1 and UE2 transmit a RRC connection reconfiguration response to the base station.

In step 6, the base station allocates resource blocks in the selected carrier to UE1 and UE2 through a PDCCH.

In step 7, UE1 and UE2 perform the proximity-based service direct communication.

In addition, according to an embodiment, a carrier for the proximity-based service direct communication may be selected based on reference signal received power (RSRP) measured for carriers in the set of carriers.

Figure 2:
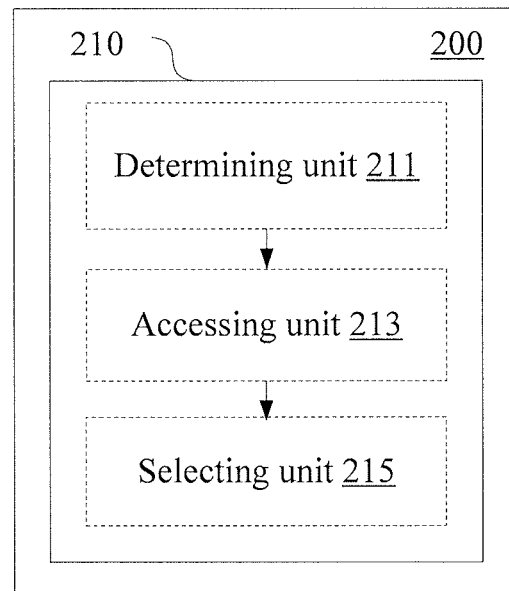
FIG. 2 is a block diagram showing a configuration example of a second determining unit in an electronic device for wireless communication according to an embodiment.

FIG. 2 shows a configuration example of an electronic device for wireless communication according to the embodiment. As shown in FIG. 2, the electronic device 200 includes at least one processor 210. The processor 210 includes a determining unit 211, an accessing unit 213 and a selecting unit 215. The determining unit 211 has similar configuration as the first determining unit 111 shown in FIG. 1, and the accessing unit 213 and the selecting unit 215 correspond to the second determining unit 113 shown in FIG. 1.

The accessing unit 213 is configured to access measurement results for reference signal received power of at least a part of carriers in a set of carriers.

The selecting unit 215 is configured to select a carrier for proximity-based service direct communication based on the measurement results. A carrier having low reference signal received power is preferentially selected. Different from a conventional manner for selecting a carrier, a carrier having a low measurement value may be selected in the embodiment of the present disclosure, this is because the quality of a radio link on the carrier between the UE and a base station is measured, whereas the objection of the selecting is for direct communication between UEs, a corresponding measurement value of a cellular UE around a carrier having a low measurement value is also low, and a probability that the carrier is selected for the cellular communication is low, therefore, so the carrier is more suitable for direct communication between UEs with low interference.

It should be noted that the accessing unit 213 may access the measurement results by accessing history measurement results for reference signal received power of different carriers. In a case that the electronic device 200 in the embodiment operates as a base station, for example, the base station may acquire the measurement results by accessing history data stored therein. Alternatively, the history measurement result for a carrier may be reported to the base station by a user equipment. In a case that the electronic device 200 operates as a user equipment, for example, the user equipment may acquire the measurement results by accessing history data stored in a serving base station of the user equipment. Alternatively, the user equipment may access a history measurement result stored therein.

In another aspect, the accessing unit 213 may also access the measurement results by accessing a real-time measurement result of a user equipment for a predetermined carrier. For example, in a case that the electronic device 200 operates as a base station, the base station may notify a user equipment of candidate carriers for proximity-based service direct communication (for example an embodiment described below in FIG. 3). In other words, the base station performs a special measurement configuration on the user equipment, and acquires measurement results of the user equipment for RSRP of the candidate carriers. In a case that the electronic device 200 operates as a user equipment, the user equipment may select a carrier for proximity-based service direct communication based on measurement results for the candidate carriers.

In addition, according to some embodiments, the carrier for the proximity-based service direct communication may be selected not based on measurement results for all candidate carriers.

For example, according to an embodiment, the selecting unit 213 may be configured to, in a case that measurement results are not acquired for all candidate carriers within a predetermined time period, select a carrier for proximity-based service direct communication from carriers for which measurement results have been acquired.

According to another embodiment, the selecting unit 213 may be configured to, in a case that a measurement result meeting a condition, for example, a measurement result lower than a predetermined threshold is acquired, select a corresponding carrier as a carrier to be used for the proximity-based service direct communication.

According to another embodiment, the selecting unit 213 may be configured to, in a case that a measurement result constantly less than a predetermined threshold within a predetermine time period is acquired, select a corresponding carrier as a carrier to be used for the proximity-based service direct communication.

Efficiency of measuring and selecting the candidate carriers can be further improved by the above embodiment.

Next, the above embodiments are described in conjunction with specific examples, which include multiple aspects of the above embodiments. It should be understood that the present disclosure is not limited details in the examples below.

First, the base station generates a list of selectable carriers for each group of user equipments which is to perform proximity-based service direct communication. The list may include all carriers available for the proximity-based service direct communication of the group of user equipments. As described above, the base station may rank the available carriers based on usage of the carriers. For example, for a user pair composed of UE1 and UE2 for the proximity-based service direct communication,

TABLE 3

| List of selectable carriers |
|---|
| CC5 |
| CC6 |
| ... |
| CCn | where CC5, CC6 ... are incremented sequentially.

In order to avoid a long time delay caused by a long measurement process of the user equipment, a timer may be provided.

When the timer overflows, the user equipment stops measuring and reports measurement results.

The base station may transmit the list of selectable carriers to the user equipment through, for example, RRC-ConnectionReconfiguration signaling.

Upon receiving the list of selectable carriers, the user equipment starts to measure RSRP of the carriers in sequence. For example, RSRPs of CC5 to CCn are measured in a time range of the timer, as shown in Table 4.

TABLE 4

| List of selectable carriers | RSRP |
|---|---|
| CC5 | RSRP 5 |
| CC6 | RSRP 6 |
| ... | ... |
| CCn | RSRP n |

After measuring the RSRP, the user equipment may report measurement results to the base station directly, and the base station selects a carrier for proximity-based service direct communication. Alternatively, the user equipment may select a carrier, for example, CC6 for the proximity-based service direct communication based on the measurement results, and reports a selection result to the base station.

After receiving information from UE2, the eNB configures CC6 for UE1 and UE2 through RRC Connection reconfiguration as a carrier for the proximity-based service direct communication.

In addition, in a case that the list of selectable carriers contains a large number of carriers, time and energy consumption consumed by the measurement process of the UE may be large. Therefore, a following measurement event may be defined: RSRP of the measured carrier is less than a certain threshold which may be defined in advance.

UE may measure carriers in the list of selectable carriers sequentially based on priority levels of the carriers, and the following conditions may be defined:

an event entry condition: Mr<threshold Th
an event exit condition: Mr>threshold Th Where Mr is a measurement result for RSRP of the current carrier.

After entering into an event, UE may set a triggering time for a current carrier, and continuously measures RSRP of the current carrier within the triggering time.

When continuously measuring the current carrier, UE may also keep measuring other CCs.

If the current carrier meets a predetermined requirement within the triggering time, UE stops measuring and reports the current carrier as a carrier for proximity-based service direct communication.

If the current carrier does not always meet the predetermined requirement within the triggering time, the event exits.

Figure 11:
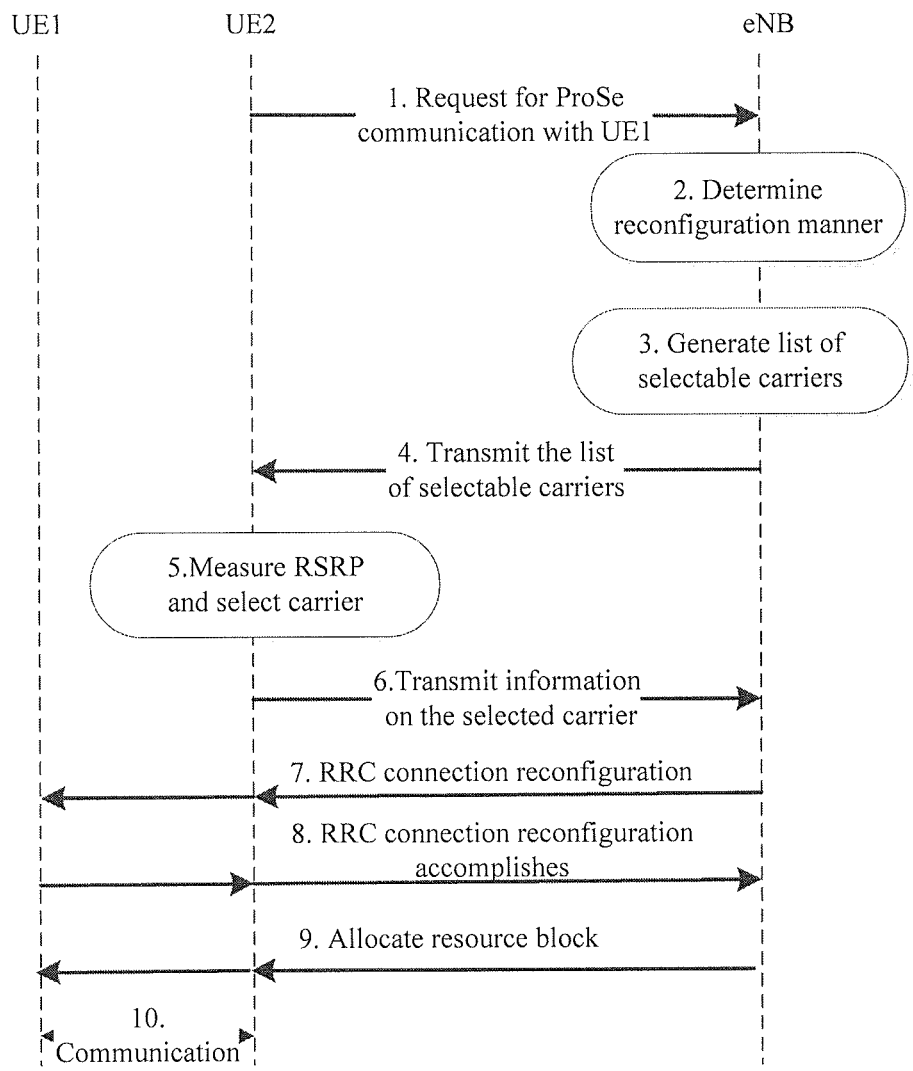
FIG. 11 is a signaling flow chart for explaining a process example of a radio resource configuration according to an embodiment of the present disclosure.

Next, an exemplary process of measuring and selecting a carrier by a user equipment is described with reference to FIG. 11.

In step 1, UE2 transmits a request for proximity-based service direct communication with UE1 to a base station.

In step 2, the base station determines reconfiguration for carrier aggregation, for example, adding a new component carrier for UE1.

In step 3, the base station generates a list of selectable carriers.

In step 4, the base station transmits the list of selectable carriers to UE1.

In step 5, UE1 measures RSRP of carriers in the list of selectable carriers, and selects a carrier for the proximity-based service direct communication.

In step 6, UE1 transmits information on the selected carrier to the base station.

In step 7, the base station transmits RRC connection reconfiguration signaling to
UE1 and UE2.

In step 8, UE1 and UE2 transmit to a RRC connection reconfiguration response to the base station.

In step 9, the base station allocates resource blocks in the selected carrier to UE1 and
UE2 through a PDCCH.

In step 10, UE1 and UE2 perform the proximity-based service direct communication.

A configuration example of an electronic device for wireless communication according to another embodiment of the present disclosure is described below with reference to FIG. 3.

Figure 3:
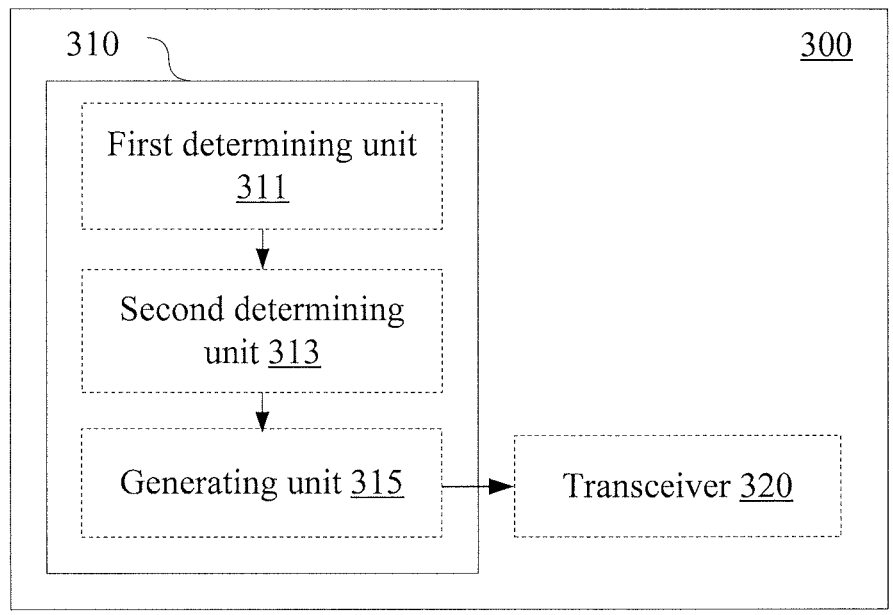
FIG. 3 is a block diagram showing a configuration example of an electronic device for wireless communication according to another embodiment.

As shown in FIG. 3, the electronic device 300 includes at least one processor 310. The processor 310 includes a first determining unit 311, a second determining unit 313 and a generating unit 315. The first determining unit 311 and the second determining unit 313 have similar configuration to the first determining unit 111 and the second determining unit 113 described with reference to FIG. 1. Alternatively, the second determining unit 313 may correspond to the accessing unit 213 and the selecting unit 215 described above with reference to FIG. 2.

The generating unit 315 is configured to generate indication information on carriers in a set of carriers serving as candidate carriers for proximity-based service direct communication. For example, sl-CommConfig in an RRCConnectionReconfiguration message may include specified carrier indication or candidate carrier indication.

In addition, the indication information on the candidate carriers may further include information on priority rankings of the candidate carriers. For example, an order of a candidate carrier in the set of candidate carriers may correspond to the priority level of the candidate carrier. Alternatively, the indication information on the candidate carriers may include information on priority levels of corresponding candidate carriers.

In addition, as shown in FIG. 3, according to an embodiment, the electronic device 300 may further include a transceiver 320. In a case that the electronic device 300 operates as a base station, the transceiver 320 may be configured to transmit the indication information on the candidate carriers to at least a user equipment which is to perform proximity-based service direct communication.

Specifically, the transceiver 320 may be configured to transmit the indication information on the candidate carriers through RRC signaling.

The embodiment in which the carrier for the proximity-based service direct communication is determined from a predetermined set of carriers is described above. In addition, according to an embodiment, the set of carriers may include a set of fixed carriers dedicated for the proximity-based service direct communication. In other words, a carrier-grade resource pool may be set specially for the proximity-based service direct communication. Each carrier in the set of fixed carriers may have a corresponding unique resource configuration, such as control transfer cyclic prefix length of a sidelink on the carrier, a period of control transmission on the sidelink, a specific time-frequency resource block configuration of control transfer on the sidelink, cyclic prefix length of data on the sidelink, a frequency hopping configuration of data of the sidelink, and resource configuration selected by a user (time-frequency resource configuration of data on the sidelink).

An exemplary manner of setting the set of dedicated carriers is described below in conjunction an example.

In a manner of setting the set of dedicated carriers, carriers in the carrier set are used for proximity-based service direct communication in a case of carrier aggregation, which may have two kinds of configuration manners of static carrier set and dynamic carrier set.

Carriers in the static carrier set are fixed, and are generally narrow-band carriers, which are set to be only used for the proximity-based service direct communication, and cannot be used for cellular communication. Carriers in the dynamic carrier set may be updated but can be set that the number of carriers in the dynamic carrier set is constant, and the carriers may be used for both the proximity-based service direct communication and the cellular communication.

Exemplary structure of the set of carriers is shown in Table 5.

TABLE 5

| Type | Carrier ID | Carrier |
|---|---|---|
| 0/1 | 1 | CC1 |
|  | 2 | CC3 |
|  | 3 | CC5 |
|  | ... | ... |

Where a type 0 of the set of carriers represents static, and a type 1 represents dynamic.

A carrier ID represents a number of a carrier in the set of carriers.

A carrier such as CC1 and CC3 in Table 5 represents a frequency range of the carrier in the set of carriers.

Carriers in the dynamic carrier set may be ranked based on priority levels, for example, a priority level of a carrier with a less number of multiplexing is higher.

The static carrier set may be broadcasted for example in an SIB, and the dynamic carrier set may be configured through for example RRC signaling.

An example of static carrier set is described more specifically below. M fixed carriers (M may be configured according to actual cases) may be reserved by the base station, and the carriers are only used for the proximity-based service direct communication.

For example, in a case of M=3, resources CC1, CC2 and CC3 are reserved, and the static carrier set is as shown in Table 6.

TABLE 6

| Type | Carrier ID | Carrier |
|---|---|---|
| 0 | 1 | CC1 |
|  | 2 | CC2 |
|  | 3 | CC3 |

For an operator, if there is a fixed correspondence between carrier IDs and carriers, the carriers in Table 6 may be omitted. Correspondingly, the broadcast information of the static carrier set can contain only the carrier IDs, thereby reducing information load for broadcasting.

In addition, when a static carrier set for proximity-based service direct communication is set for a user equipment initially, multiple different static carrier sets may be configured, and the user equipment may select a static carrier set to be used.

Furthermore, according to an embodiment, a set of carriers dedicated for proximity-based service direct communication may be set based on a cover range of a secondary cell (SCell). The set of carriers includes multiple sets of fixed carriers dedicated for the proximity-based service direct communication, and each of the sets of fixed carriers is used for proximity-based service direct communication in a specified range.

According to 3GPP TS36.300, cover ranges of Scells may be different from each other. A set of static carriers for proximity-based service direct communication is set based on a cover range of an Scell, and a set of static carriers is configured for each cover range, and each set of static carriers may serve as one group of the static carrier set configured initially.

A set of carriers for proximity-based service direct communication corresponding to an Scell in a current cover range includes CCs in Scells which do not overlap with the Scell.

Figure 13:
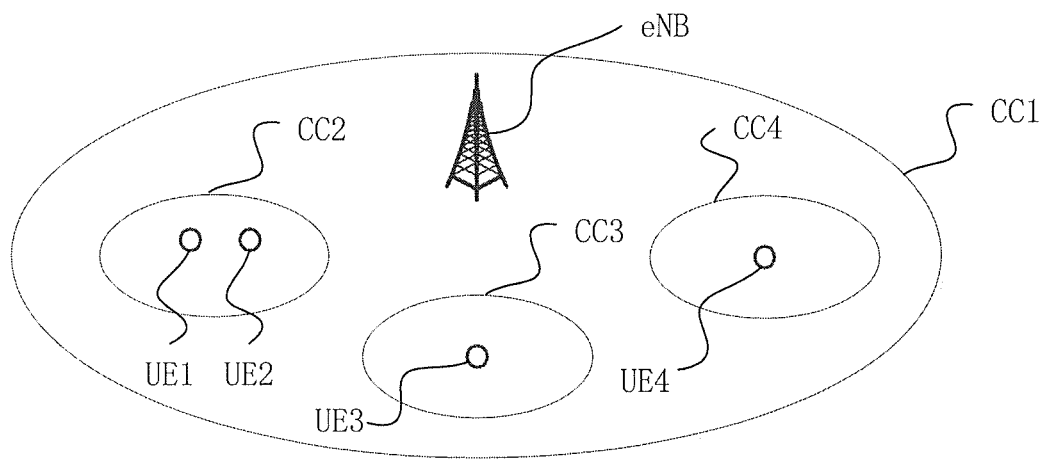
FIG. 13 is a schematic diagram for explaining an exemplary manner of a radio resource configuration according to an embodiment of the present disclosure.
Figure 14:
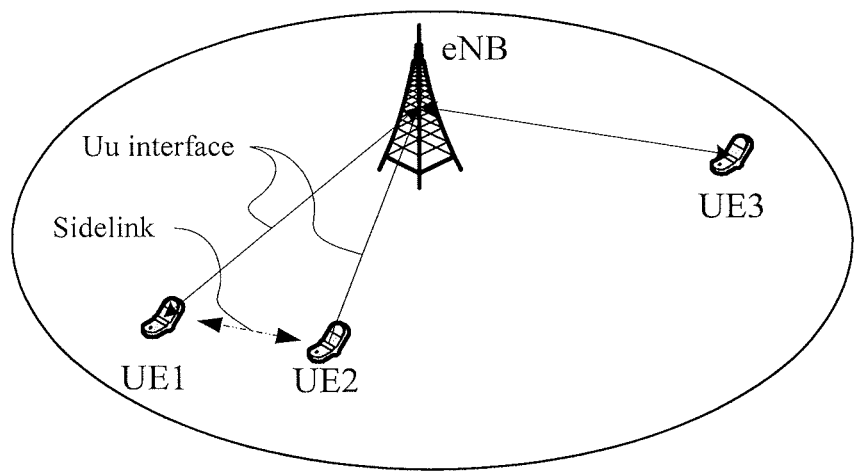
FIG. 14 is a schematic diagram for explaining a proximity-based service direct communication.

A situation shown in FIG. 13 is described below as an example. As shown in FIG. 13, CC1 has a full cover range, and CC2, CC3 and CC4 have different cover ranges. UE1 and UE2 are in the cover range of CC2, UE3 is in the cover range of CC3, and UE4 is in the cover range of CC4. In this case, multiple sets of carriers may be set according to the cover ranges.

Carriers in a static carrier set corresponding to the cover range of CC2 are CC3 and CC4.

Carriers in a static carrier set corresponding to the cover range of CC3 are CC2 and CC4.

Carriers in a static carrier set corresponding to the cover range of CC4 are CC2 and CC3.

Correspondingly, information on a static carrier set transmitted by a base station to all UEs through an SIB may be as shown in Table 7 below.

TABLE 7

| Type | Static carrier set ID | Carrier ID |
|---|---|---|
| 0 | 1 | CC3, CC4 |
|  | 2 | CC2, CC4 |
|  | 3 | CC2, CC3 |

After receiving a grouped pool information in a grouped manner, a UE selects a set of carriers and then select a carrier in the set of carriers.

For example, an exemplary manner of selecting a set of carriers by a UE is: randomly selecting a set of carriers from existing sets of carriers; comparing carriers in the set of carriers with a carrier being used for cellular communication of the UE; if the carriers in the set of carriers are different from the carrier being used for the cellular communication, then preferentially using the set of the carriers; if a carrier in the set of carriers is the same as the carrier being for the cellular communication, randomly selecting a set of carriers from one or more sets of carriers having a same carrier.

As an example, the UE may randomly select a carrier from a set of carriers, alternatively, the UE may detect a center frequency of each of carriers in the set of carriers, and select a carrier having the smallest received signal strength.

An interference of the proximity-based service direct communication on the cellular communication can be further reduced through the above configuration.

Next, an exemplary configuration manner of a set of dynamic carriers is described.

Before configuring the dynamic carrier set for a UE, a base station may select M carriers having the least multiplexing number based on multiplexing of carriers reserved currently. The M carriers may be used for both the cellular communication and the proximity-based service direct communication.

For example, M=3, three CCs having the least multiplexing number are CC5, CC6 and CC7, and the set of dynamic carriers is as shown in Table 8 below.

TABLE 8

| Type | Carrier ID | Carrier |
|---|---|---|
| 1 | 1 | CC5 |
|  | 2 | CC6 |
|  | 3 | CC7 |

Figure 12:
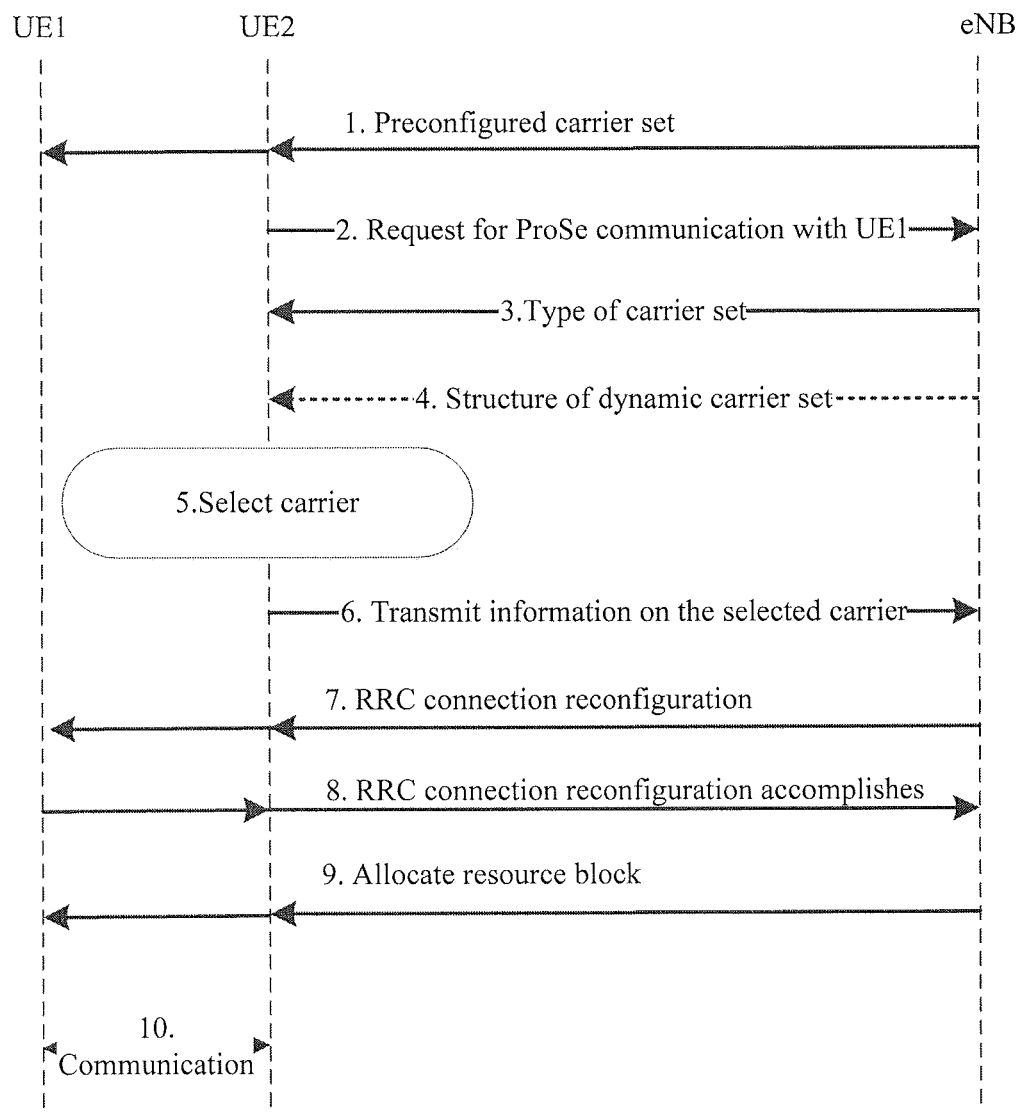
FIG. 12 is a signaling flow chart for explaining a process example of a radio resource configuration according to an embodiment of the present disclosure.

A process example of using the set of carriers is described below with reference to FIG. 12.

In step 1, a base station broadcasts a static carrier set for example through an SIB, and a UE may store information on the set of carriers.

In step 2, the user equipment a requests for proximity-based service direct communication.

In step 3, the base station transmits information on a type of carrier set to the user equipment, to indicate the type of the set of carriers used by the user equipment, and the indication information occupies for example 1 bit.

If the type of the carrier set is dynamic, step 4 is performed, in which, the base station notifies the user equipment of a structure of the dynamic carrier set.

If the type of the carrier set is static, step 5 is performed by skipping step 4, in step 5, the user equipment selects a carrier for proximity-based service direct communication.

In step 6, the user equipment notifies the base station of the selected carrier.

In step 7, the base station transmits RRC connection reconfiguration signaling to UE1 and UE2.

In step 8, UE1 and UE2 transmit a RRC connection reconfiguration response to the base station.

In step 9, the base station allocates a resource block in the selected carrier to UE1 and UE2 through a PDCCH.

In step 10, UE1 and UE2 perform the proximity-based service direct communication.

As described above, the electronic device for wireless communication according to an embodiment of the present disclosure may operate as a base station. A configuration example of an electronic device according to the embodiment is described below with reference to FIG. 4.

Figure 4:
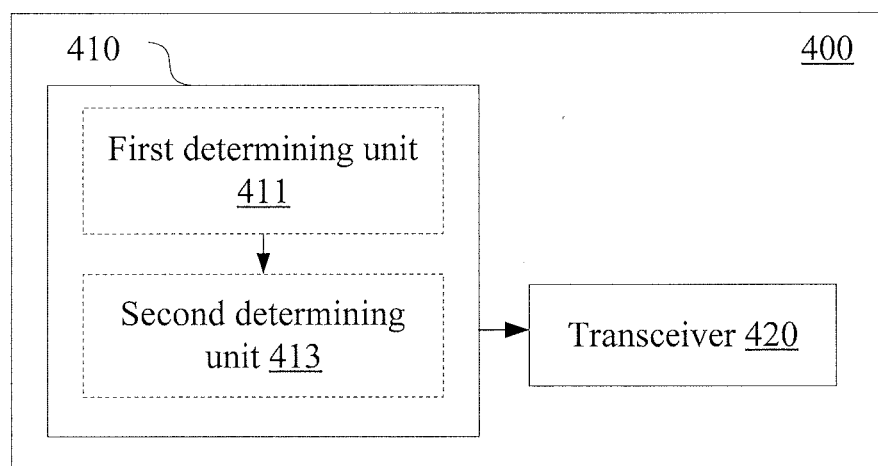
FIG. 4 is a block diagram showing a configuration example of an electronic device for wireless communication according to another embodiment.

As shown in FIG. 4, the electronic device 400 according to the embodiment includes at least one processor 410 and a transceiver 420. The processor 410 includes a first determining unit 411 and a second determining unit 413 which have similar configuration to the first determining unit and the second determining unit described above, respectively.

The transceiver 420 is configured to transmit indication information on a set of carriers. The set of carriers may include a set of carriers such as a static carrier set or a dynamic carrier set dedicated for proximity-based service direct communication described above with reference to the embodiments. The transceiver 420 may broadcast the indication information, or may transmit the indication information through RRC signaling.

More specifically, the transceiver 420 may be configured to, for example, broadcast the indication information on the set of carriers through a system information block. For example, the transceiver may transmit SystemInformationBlockType18 on a broadcast control channel (BCCH).

As described above, the electronic device for wireless communication according to some embodiments of the present disclosure may operate as a user equipment. A configuration example of the electronic device according to the embodiments is described below with reference to FIG. 5 to FIG. 7.

Figure 5:
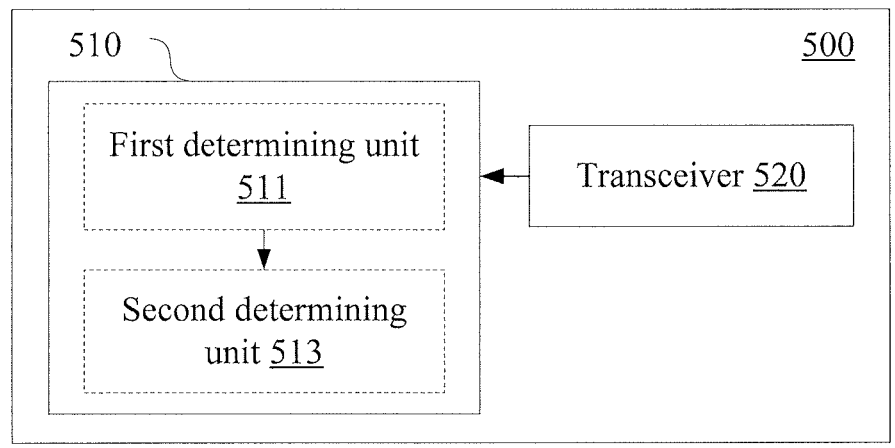
FIG. 5 is a block diagram showing a configuration example of an electronic device for wireless communication according to another embodiment.

As shown in FIG. 5, the electronic device 500 for wireless communication according to an embodiment includes at least one processor 510 and a transceiver 520. The processor 510 includes a first determining unit 511 and a second determining unit 513 which have similar configuration to the first determining unit and the second determining unit described above, respectively.

The transceiver 520 is configured to receive indication information for candidate carriers for proximity-based service direct communication from a base station.

Figure 6:
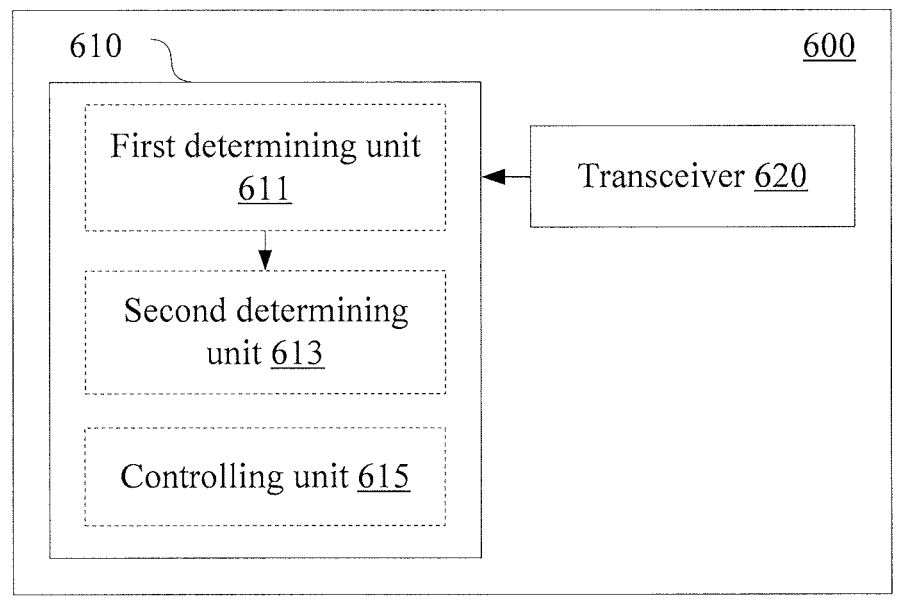
FIG. 6 is a block diagram showing a configuration example of an electronic device for wireless communication according to another embodiment.

As shown in FIG. 6, an electronic device 600 for wireless communication according to another embodiment includes at least one processor 610 and a transceiver 620. The processor 610 includes a first determining unit 611, a second determining unit 613 and a controlling unit 615. The first determining unit 611 has similar configuration to the first determining unit described above, and the transceiver 620 has similar configuration to the transceiver 520 described with referent to FIG. 5.

The controlling unit 615 is configured to control a measurement for reference signal received power of the candidate carriers.

The second determining unit 613 is configured to select a carrier to be used for proximity-based service direct communication based on measurement results of the reference signal received power, a carrier having low reference signal received power is preferentially selected.

In addition, according to an embodiment, the second determining unit 613 is configured to, in a case that measurement results for all carriers in the candidate carriers is not acquired within a predetermined time period, select a carrier for proximity-based service direct communication from the carriers for which the measurement results are acquired.

According to another embodiment, the second determining unit 613 is configured to, in a case that a measurement result meeting a condition, for example, a measurement result lower than a predetermined threshold is acquired, select a corresponding carrier as the carrier to be used for the proximity-based service direct communication.

According to yet another embodiment, the second determining unit 613 is configured to, in a case that a measurement result which is constantly lower than a predetermined threshold within a predetermined time period is acquired, select a corresponding carrier as the carrier to be used for the proximity-based service direct communication.

Figure 7:
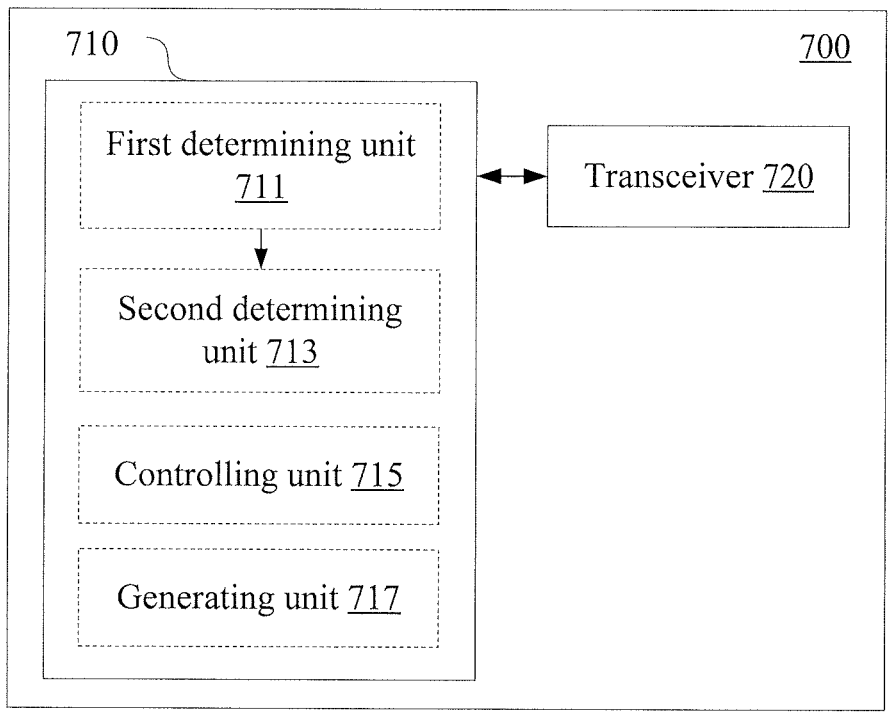
FIG. 7 is a block diagram showing a configuration example of an electronic device for wireless communication according to another embodiment.

As shown in FIG. 7, an electronic device 700 for wireless communication according to another embodiment includes at least one processor 710 and a transceiver 720. The processor 710 includes a first determining unit 711, a second determining unit 713, a controlling unit 715 and a generating unit 717. The first determining unit 711 has similar configuration to the first determining unit described above.

The controlling unit 715 is configured to control a measurement for reference signal received power of candidate carriers.

The generating unit 717 is configured to generate indication information on measurement results for the reference signal received power of the candidate carriers.

The transceiver 720 has similar configuration to the transceiver 520 described with reference to FIG. 5. In addition, the transceiver 720 is further configured to transmit the indication information on the measurement results.

Some processing and methods are disclosed apparently in the description for the device according to the embodiments of the present disclosure, in the following, a wireless communication method according to an embodiment of the present disclosure is described without repeating details described above.

Figure 8:
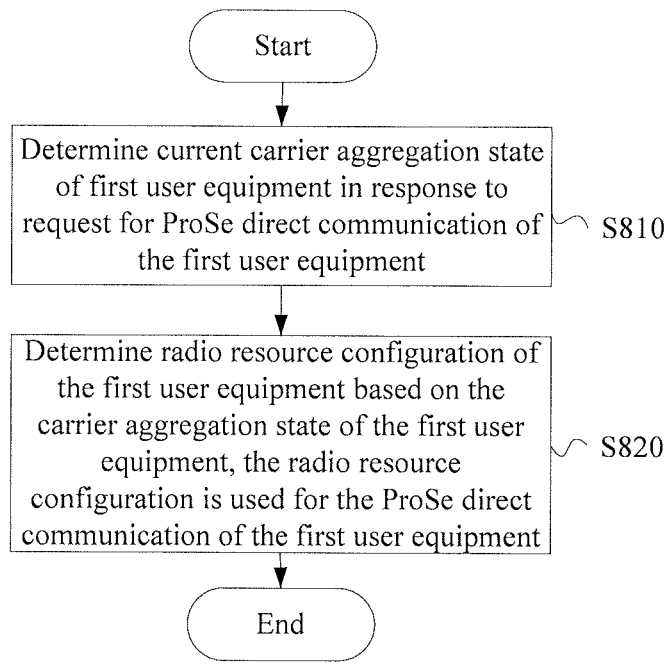
FIG. 8 is a flow chart of a process example of a wireless communication method according to an embodiment of the present disclosure.

As shown in FIG. 8, a wireless communication method according to an embodiment of the present disclosure includes step S810 of determining a current carrier aggregation state of a first user equipment in response to a request for proximity-based service direct communication of the first user equipment. In addition, the method further include step S820 of determining radio resource configuration of the first user equipment based on the carrier aggregation state of the first user equipment, where the radio resource configuration is used for the proximity-based service direct communication of the first user equipment.

With reference to the above description, steps in the wireless communication method according to the embodiment may be performed by a base station or a user equipment, or may be performed by both the base station and the user equipment.

Figure 18:
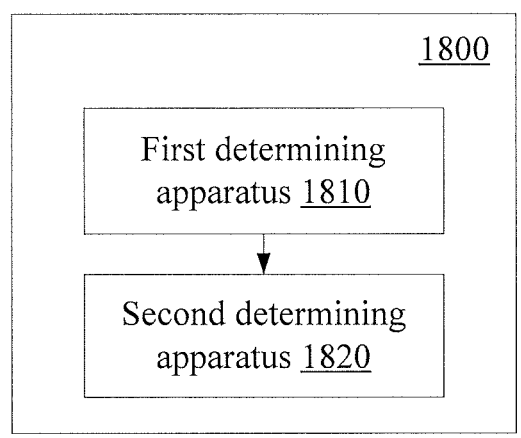
FIG. 18 is a block diagram showing a configuration example of an electronic device for wireless communication according to an embodiment of the present disclosure.

FIG. 18 shows a configuration example of a device for wireless communication according to an embodiment of the present disclosure. As shown in FIG. 18, the device 1800 according to the embodiment includes a first determining apparatus 1810 and a second determining apparatus 1820. The first determining apparatus 1810 is configured to determine a current carrier aggregation state of a first user equipment in response to a request for proximity-based service direct communication of the first user equipment. The second determining apparatus 1820 is configured to determine radio resource configuration of the first user equipment based on the carrier aggregation state of the first user equipment, where the radio resource configuration is used for the proximity-based service direct communication of the first user equipment. The device 1800 may implemented as a base station and a user equipment.

As an example, all steps of the method described above and all component modules and/or units of the devices described above may be implemented with software, firmware, hardware or a combination thereof. In a case that the steps or component modules are implemented with software or firmware, programs constituting the software for implementing the method described above is installed into a computer (for example, a general-purposed computer 1500 as shown in FIG. 15) having a dedicated hardware structure from a storage medium or network, the computer can execute various functions while being installed with various programs.

Figure 15:
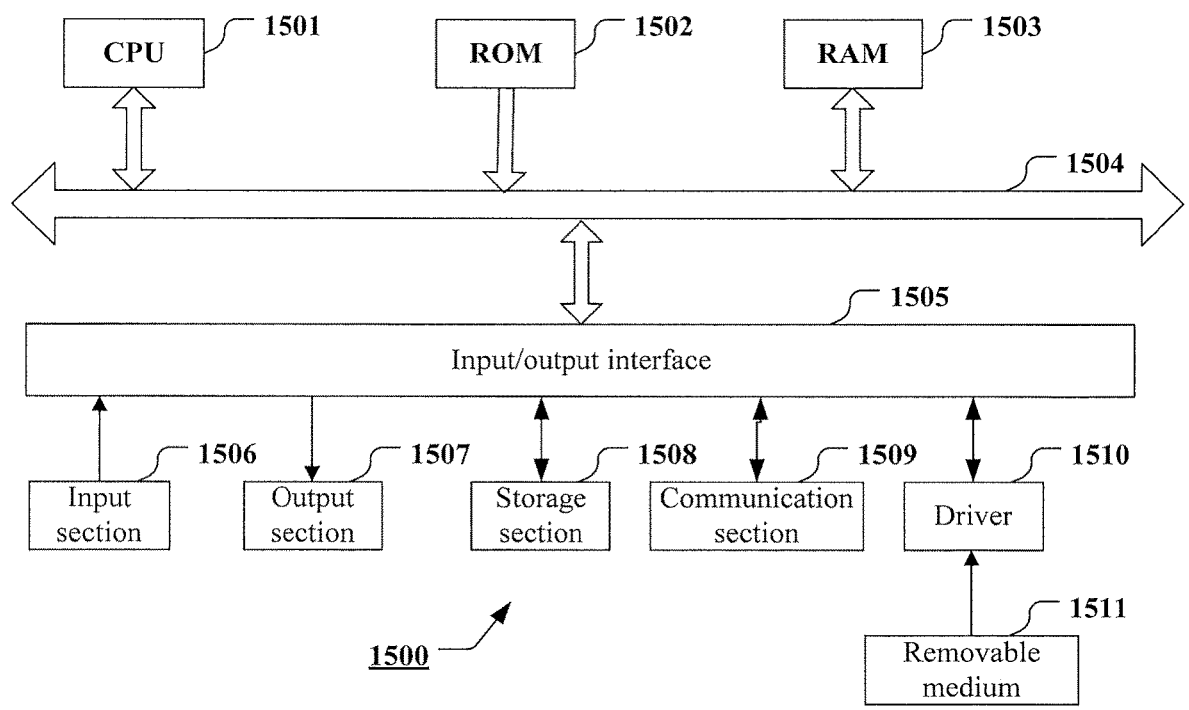
FIG. 15 is a block diagram showing an exemplary structure of a computer for implementing a method and a device according to the present disclosure.

In FIG. 15, a central processing unit (CPU) 1501 executes various processing according to a program stored in a read-only memory (ROM) 1502 or a program loaded to a random access memory (RAM) 1503 from a storage section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including a display such as a cathode ray tube (CRT), a liquid crystal display (LCD), a speaker and the like), a storage section 1508 (including hard disc and the like), and a communication section 1509 (including a network interface card such as a LAN card, a modem and the like). The communication section 1509 performs communication processing via a network such as the Internet. A driver 1510 may also be linked to the input/output interface 1505 according to needs. A removable medium 1511 such as a magnetic disc, an optical disc, a magnetic optical disc and a semiconductor memory may be installed in the driver 1510 according to needs, so that the computer program read therefrom is installed in the storage section 1508 according to needs.

In the case where the foregoing series of processing is achieved with software, programs forming the software are installed from a network such as the Internet or a storage medium such as the removable medium 1511.

It should be appreciated by those skilled in the art that the storage medium is not limited to the removable medium 1511 shown in FIG. 15, which has program stored therein and is distributed separately from the device so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)) and a semiconductor memory. Alternatively, the storage medium may be ROM 1502 and a hard disc included in the storage section 1508, in which programs are stored, and can be distributed to users along with the device in which they are incorporated.

The embodiments of the present disclosure further relates to a program product on which machine-readable instruction codes are stored. The machine-readable instruction codes can enable a machine to execute the methods according to the embodiments of the present disclosure described above when being read and executed by the machine.

Accordingly, a storage medium for carrying the program product on which the machine-readable instruction codes are stored is also included in the present disclosure. The storage medium includes but not limited to a floppy disk, an optical disk, a magneto-optical disk, a memory card, a memory stick and the like.

The embodiments of the present disclosure further relates to the following electronic device. In a case that the electronic device is applied into a base station side, the electronic device can be implemented as any types of evolved node B (eNB), such as a macro eNB and a small eNB. The small eNB may be an eNB of a cell having a smaller cover range than a macro cell, such as a pico-cell eNB, a micro-cell eNB and a family (femto-cell) eNB. Alternatively, the electronic device may also be implemented as any types of base stations, such as a NodeB and a base transceiver station (BTS). The electronic device may include an entity (also referred to a base station device) configured to control wireless communication; and one or more remote radio head (RRH) arranged in a position different from the entity. In addition, any types of terminals described below can operate as a base station by temporarily or semi-persistently performing a function of the base station.

In a case that the electronic device is applied to use equipment side, the electronic device can be implemented as a mobile terminal (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module (such as an integrated circuit module including one or more chips) installed on each of the terminals described above.

[Application Example of a Terminal Device]

Figure 16:
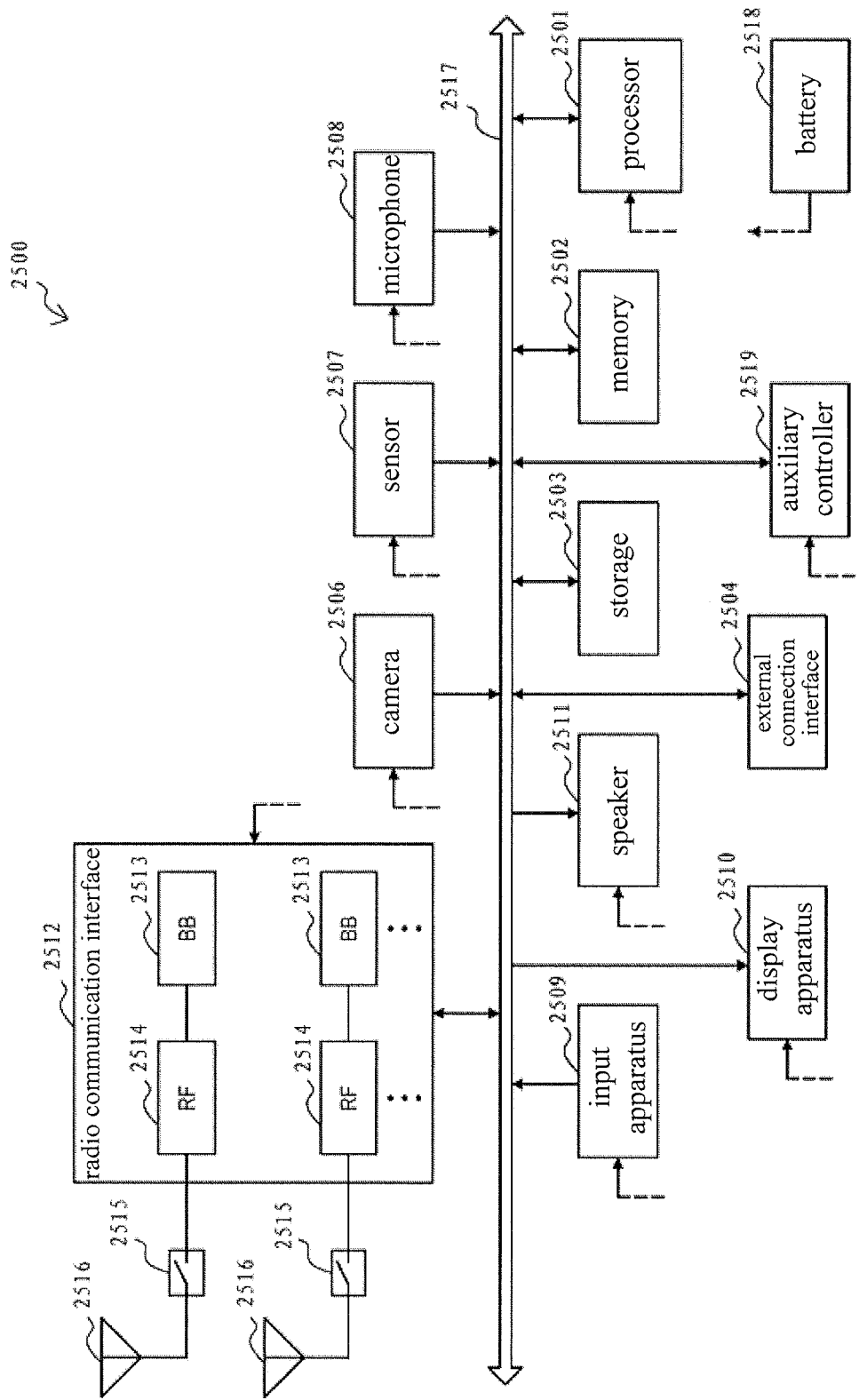
FIG. 16 is a block diagram showing a schematic configuration example of a smart phone to which technology of the present disclosure may be applied.

FIG. 16 is a block diagram showing a schematic configuration example of a smart phone 2500 in which the technology of the present disclosure may be applied. The smart-phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518 and an auxiliary controller 2519.

The processor 2501 may be for example a CPU or a system on chip (SoC), and controls functions of an application layer and other layers of the smart phone 2500. The memory 2502 includes a RAM and a ROM, and stores a program executed by the processor 2501 and data. The storage 2503 may include a storage medium such as a semiconductor memory and a hard disk. The external connection interface 2504 is an interface for connecting the external device (such as a memory card and a universal serial bus (USB) device) to the smart phone 2500.

The camera 2506 includes an image sensor (such as a charge-coupled device (CCD) and a complementary metal oxide semiconductor (CMOS)), and generates a captured image. The sensor 2507 may include a group of sensors such as a measurement sensor, a gyroscope sensor, a geomagnetic sensor and an acceleration sensor. The microphone 2508 switches the sound inputted to the smart phone 2500 into an audio signal. The input apparatus 2509 includes a touch sensor configured to detect touch on a screen of the display apparatus 2510, a keypad, a keyboard, a button or a switch, and receive an operation and information inputted from the user. The display apparatus 2510 includes a screen (such as a liquid crystal display (LCD) and an organic light-emitting diode (OLED)), and displays an output image of the smart phone 2500. The speaker 2511 converts the audio signal outputted from the smart phone 2500 into sound.

The radio communication interface 2512 supports any cellular communication scheme (such as LTE and LTE-advanced), and execute wireless communication. The radio communication interface 2512 may include for example a BB processor 2513 and a RF circuit 2514. The BB processor 2513 may execute for example encoding/decoding, modulation/demodulation and multiplexing/demultiplexing, and execute various types of signal processing for wireless communication. The RF circuit 2514 may include for example a frequency mixer, a filter or an amplifier, and transmit and receive a radio signal via the antenna 2516. The radio communication interface 2512 may be a chip module on which the BB processor 2513 and the RF circuit 2514 are integrated. As shown in FIG. 16, the radio communication interface 2512 may include multiple BB processors 2513 and multiple RF circuits 2514. Although the radio communication interface 2512 shown in FIG. 16 includes multiple BB processors and multiple RF circuits 2514, the radio communication interface 2512 may include a single BB processor 2513 and a single RF circuit 2514.

In addition to the cellular communication scheme, the radio communication interface 2512 may support other types of wireless communication scheme, such as a short-distance wireless communication scheme, a near field communication scheme and a wireless local area network (LAN) scheme. In this case, the radio communication interface 2512 may include a BB processor 2513 and a RF circuit 2514 for each wireless communication scheme.

Each of the antenna switches 2515 switches a connection destination of the antenna 2516 between multiple circuits (for example, a circuit for different wireless communication schemes) included in the radio communication interface 2512.

Each of the antennas 2516 includes one or more antenna elements (for example, multiple antenna elements included in the MIMO antenna), and is used for transmitting and receiving a radio signal via the radio communication interface 2512. As shown in FIG. 16, the smart phone 2500 may include multiple antennas 2516. Although the smart phone 2500 shown in FIG. 16 includes multiple antennas 2516, the smart phone 2500 may include a single antenna 2516.

In addition, the smart phone 2500 may include an antenna 2516 for each wireless communication scheme. In this case, the antenna switch 2515 may be omitted in the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512 and the auxiliary controller 2519 with each other. The battery 2518 supplies power to each block in the smart phone 2500 shown in FIG. 16 via a feed line, which is shown as a dash line in FIG. 16. The auxiliary controller 2519 operates a minimum necessary function of the smart phone 2500 in a sleep mode.

In the smart phone 2500 shown in FIG. 16, the transceiver shown in FIG. 3 to FIG. 7 can be implemented by the radio communication interface 2512. At least part of the functions of units described with reference to FIG. 1 to FIG. 7 may be realized by the processor 2501 and the auxiliary controller 2519. For example, the auxiliary controller 2519 may execute a part of functions of the processor 2501, to reduce power consumption of the battery 2518. In addition, the processor 2501 or the auxiliary controller 2519 may execute at least part of functions of units described with reference to FIG. 1 to FIG. 7 by executing programs stored in the memory 2502 or the storage 2503.

[Application Example of a Base Station]

Figure 17:
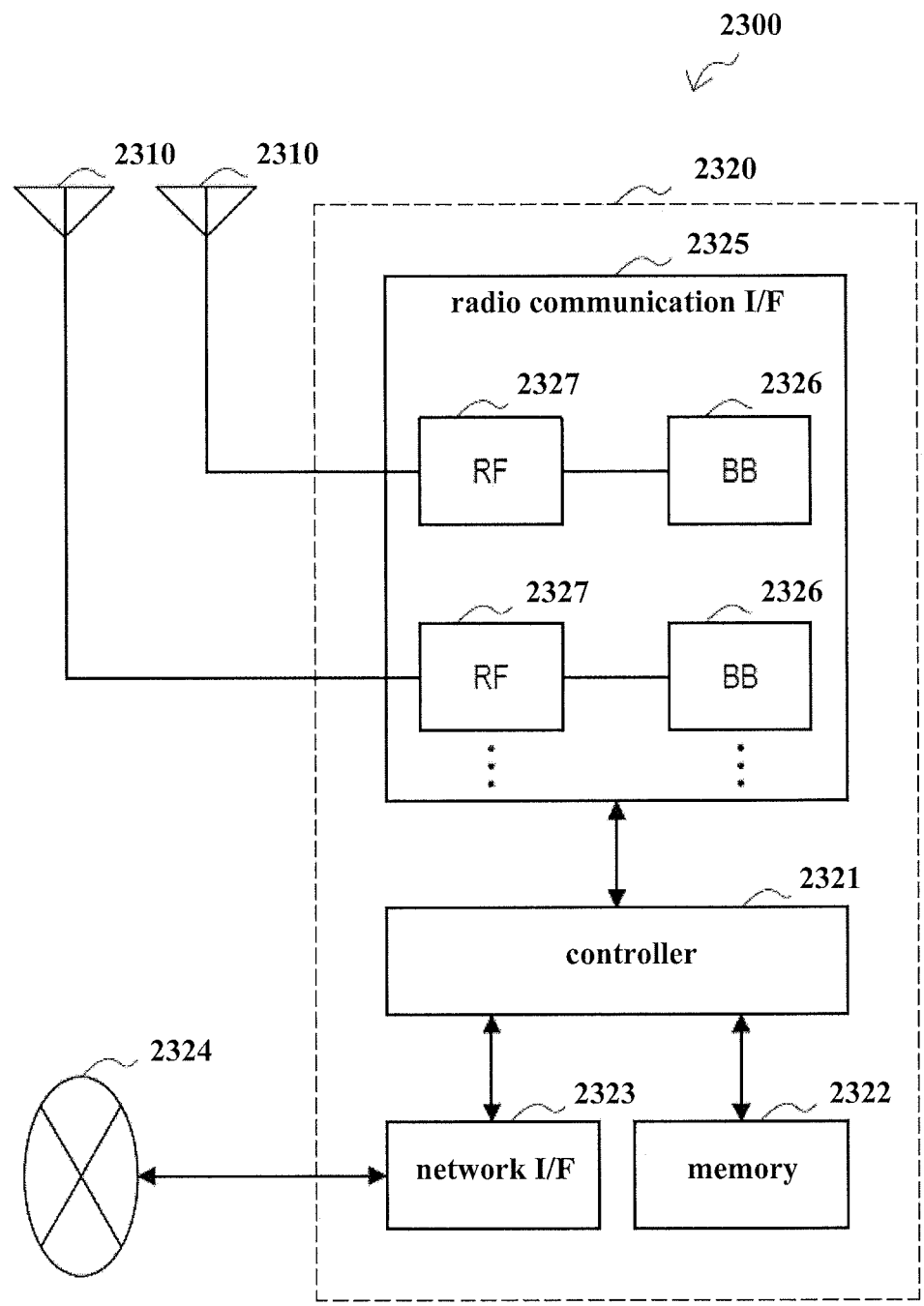
FIG. 17 is a block diagram showing a schematic configuration example of an eNB (evolved base station) to which technology of the present disclosure may be applied.

FIG. 17 is a block diagram showing a schematic configuration example of an eNB applying the technology according to the present disclosure. eNB 2300 includes one or more antennas 2310 and a base station device 2320. The base station device 2320 and each antenna 2310 may be connected with each other via radio frequency (RF) cable.

Each of the antennas 2310 includes one or more antenna elements (such as the multiple antenna elements included in the multiple-input multiple-output (MIMO) antenna), and is used for transmitting and receiving the wireless signal by the base station device 2320. As show in FIG. 17, the eNB 2300 may include multiple antennas 2310. For example, the multiple antennas 2310 may be compatible with the multiple frequency bands used by the eNB 2300. Although FIG. 17 shows an example of the eNB 2300 including multiple antennas 2310, the eNB 2300 may also include a single antenna 2310.

The base station device 2320 includes a controller 2321, a memory 2322, a network interface 2323 and a radio communication interface 2325.

For example, the controller 2321 may be a CPU or DSP, and performs various functions of higher layers of the base station device 2320. For example, the controller 2321 generates a data packet based on the data in the signal processed by the radio communication interface 2325, and transfers the generated packet via the network interface 2323. The controller 2321 may bundle data from multiple baseband processors to generate bundled data, and transfers the generated bundled data. The controller 2321 may have logical function to perform the control such as radio resource control, radio bearer control, mobility management, admission control and scheduling. The control may be performed in conjunction with the neighboring eNB or a core network node. The memory 2322 includes RAM and ROM, and stores the program to be performed by the controller 2321 and various types of control data (such as a terminal list, transmission power data and scheduling data).

The network interface 2323 is a communication interface for connecting the base station device 2320 to the core network 2324. The controller 2321 may communication with the core network node or another eNB via the network interface 2323. In this case, the eNB 2300 and the core network node or the other eNB may be connected with each other via a logic interface (such as Si interface and X2 interface). The network interface 2323 may also be a wired communication interface or a radio communication interface for wireless backhaul routing. If the network interface 2323 is a radio communication interface, the network interface 2323 may use a higher frequency band for wireless communication as compared with that used by the radio communication interface 2325.

The radio communication interface 2325 supports any cellular communication scheme (such as the long term evolution (LTE) and the LTE-Advanced), and provides a wireless connection to a terminal located in the cell of the eNB 2300 via the antenna 2310. The radio communication interface 2325 may generally include for example a baseband (BB) processor 2326 and a RF circuit 2327. The BB processor 2326 may perform for example coding/decoding, modulation/demodulation and multiplexing/de-multiplexing, and performs various types of signal processes of the layer (for example L1, media access control (MAC), radio link control (RLC) and packet data convergence protocol (PDCP)). Instead of the controller 2321, the BB processor 2326 may have some or all of the above logical functions. The BB processor 2326 may be a memory storing the communication control program, or a module including a processor and related circuit configured to perform the program. The updating program may change the function of the BB processor 2326. The module may be a card or blade inserted into the slot of the base station device 2320. Alternatively, the module may be a chip mounted on the card or the blade. The RF circuit 2327 may include for example a mixer, a filter and an amplifier, and transmit and receive the wireless signal via the antenna 2310.

As shown in FIG. 17, the radio communication interface 2325 may include multiple BB processors 2326. For example, the multiple BB processors 2326 may be compatible with the multiple frequency bands used by the eNB 2300. As shown in FIG. 17, the radio communication interface 2325 may include multiple RF circuits 2327. For example, the multiple RF circuits 2327 may be compatible with multiple antenna elements. Although an example in which the radio communication interface 2325 includes multiple BB processors 2326 and multiple RF circuits 2327 is shown in FIG. 17, the radio communication interface 2325 may also include a single BB processor 2326 and a single RF circuit 2327.

In the eNB 2300 shown in FIG. 17, the transceiver described with reference to FIG. 3 and FIG. 4 may be implemented with the radio communication interface 2325. At least a part of the functions of the units described with reference to FIG. 1 to FIG. 4 may also be performed by the controller 2321. For example, the controller 2321 may perform at least a part of the functions of the units described with reference to FIG. 1 to FIG. 4 by performing program stored in the memory 2322.

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit for the technical scope of the present disclosure.

Although the present disclosure is disclosure above by describing the above embodiment of the present disclosure, it should be understood that the above examples and embodiment are exemplary rather than restrictive. Those skilled in the art may make various modifications, improvements and equivalents within the spirit and scope of the appended claims. The modifications, improvements and equivalents should also be contained in the protection scope of the present disclosure.

The invention claimed is:

1. An electronic device for wireless communication, comprising:
   processing circuitry configured to:
   determine a current carrier aggregation state of a first user equipment in response to a request for proximity-based service direct communication of the first user equipment, the current carrier aggregation state including a number of aggregated component carriers used by the first user equipment;
   determine a radio resource configuration of the first user equipment based on the carrier aggregation state of the first user equipment, wherein the radio resource configuration is used for the proximity-based service direct communication of the first user equipment; and
   determine, from a predetermined set of carriers, a carrier for the first user equipment to perform the proximity-based service direct communication based on the number of aggregated component carriers in a case that the number of aggregated component carriers used by the first user equipment does not reach a predetermined number.

2. The electronic device according to claim 1, wherein the processing circuitry is configured to determine whether to reconfigure current carrier aggregation to enable the proximity-based service direct communication based on the determined current carrier aggregation state and equipment capability of the first user equipment.

3. The electronic device according to claim 2, wherein reconfiguring the current carrier aggregation comprises at least one of:
   releasing at least one of the aggregated component carriers; and
   configuring one of the aggregated component carriers to be used for the proximity-based service direct communication.

4. The electronic device according to claim 3, wherein the processing circuitry is configured to preferentially select, from the aggregated component carriers, a component carrier which has lower channel quality than a component carrier which has higher channel quality or is not activated, to be released or to be used as a carrier for the proximity-based service direct communication, or
   wherein the processing circuitry is configured to, in a case that a carrier currently used by a second user equipment which is to perform proximity-based service direct communication with the first user equipment is the same as one of the aggregated component carriers, select the carrier as a carrier for the proximity-based service direct communication between the second user equipment and the first user equipment.

5. The electronic device according to claim 2, wherein the predetermined set of carriers comprises a plurality of carriers which are schedulable by a serving base station of the first user equipment and are not used by the first user equipment and a second user equipment which is to perform proximity-based service direct communication with the first user equipment.

6. The electronic device according to claim 5, wherein the processing circuitry is configured to select the carrier to be used for the proximity-based service direct communication based on usage of carriers in the predetermined set of carriers by a user equipment other than the first user equipment served by the serving base station.

7. The electronic device according to claim 5, wherein the processing circuitry is configured to:
access measurement results for reference signal received power of at least part of carriers in the predetermined set of carriers; and
select, based on the measurement results, the carrier to be used for the proximity-based service direct communication, wherein a carrier with lower reference signal received power is selected preferentially than a carrier with higher reference signal received power.

8. The electronic device according to claim 5, wherein the processing circuitry is configured to generate indication information on carriers, in the predetermined set of carriers, which are candidate carriers for the proximity-based service direct communication.

9. The electronic device according to claim 8, wherein the indication information on the candidate carriers comprises information on priority rankings of the candidate carriers.

10. The electronic device according to claim 8, further comprising:
a transceiver configured to transmit the indication information on the candidate carriers to at least the first user equipment.

11. The electronic device according to claim 7, wherein the processing circuitry is configured to: in a case that not measurement results for all of the at least part of carriers are acquired within a predetermined time period, select the carrier to be used for the proximity-based service direct communication from the carriers for which the measurement results have been acquired,
wherein the processing circuitry is configured to, in a case that the measurement result lower than a predetermined threshold is acquired, select the corresponding carrier as the carrier to be used for the proximity-based service direct communication, or
wherein the processing circuitry is configured to, in a case that the measurement result which is constantly lower than a predetermined threshold within a predetermined time period is acquired, select the corresponding carrier as the carrier to be used for the proximity-based service direct communication.

12. The electronic device according to claim 2, wherein the predetermined set of carriers comprises a set of fixed carriers dedicated for proximity-based service direct communication, or
wherein the predetermined set of carriers comprises a plurality of sets of fixed carriers dedicated for proximity-based service direct communication, wherein each of the sets of carriers is used for proximity-based service direct communication in a specific range.

13. The electronic device according to claim 2, further comprising a transceiver configured to broadcast the indication information on the set of carriers through a system information block.

14. An electronic device for wireless communication, comprising:
processing circuitry configured to
determine a current carrier aggregation state of a first user equipment in response to a request for proximity-based service direct communication of the first user equipment, and
determine a radio resource configuration of the first user equipment based on the carrier aggregation state of the first user equipment, wherein the radio resource configuration is used for the proximity-based service direct communication of the first user equipment; and
a transceiver configured to receive, from a base station, indication information on candidate carriers for proximity-based service direct communication, wherein
the processing circuitry is further configured to
control a measurement for reference signal received power of the candidate carriers,
select the carrier to be used for the proximity-based service direct communication based on measurement results for the reference signal received power, and
in a case that not measurement results for all carriers of the candidate carriers are acquired within a predetermined time period, select the carrier to be used for the proximity-based service direct communication from the carriers for which the measurement results have been acquired, and
the electronic device operates as the first user equipment.

15. The electronic device according to claim 14, wherein the processing circuitry is configured to:
select the carrier to be used for the proximity-based service direct communication based on measurement results for the reference signal received power, wherein a carrier having lower reference signal received power is selected preferentially than a carrier having higher reference signal received power.

16. The electronic device according to claim 15,
wherein the processing circuitry is configured to: in a case that the measurement result lower than a predetermined threshold is acquired, select the corresponding carrier as the carrier to be used for the proximity-based service direct communication.

17. The electronic device according to claim 14, wherein the processing circuitry is further configured to:
generate indication information on measurement results for the reference signal received power of the candidate carriers.

18. An electronic device for wireless communication, comprising:
processing circuitry configured to
determine a current carrier aggregation state of a first user equipment in response to a request for proximity-based service direct communication of the first user equipment, and
determine a radio resource configuration of the first user equipment based on the carrier aggregation state of the first user equipment, wherein the radio resource configuration is used for the proximity-based service direct communication of the first user equipment; and a transceiver configured to receive, from a base station, indication information on candidate carriers for proximity-based service direct communication, wherein the processing circuitry is further configured to control a measurement for reference signal received power of the candidate carriers, select the carrier to be used for the proximity-based service direct communication based on measurement results for the reference signal received power, and in a case that the measurement result which is constantly lower than a predetermined threshold within a predetermined time period is acquired, select the corresponding carrier as the carrier to be used for the proximity-based service direct communication, and the electronic device operates as the first user equipment.

* * * * *